Oct. 27, 1959     V. R. ABRAMS     2,909,985
FOOD STERILIZER
Filed Jan. 7, 1955     3 Sheets-Sheet 1
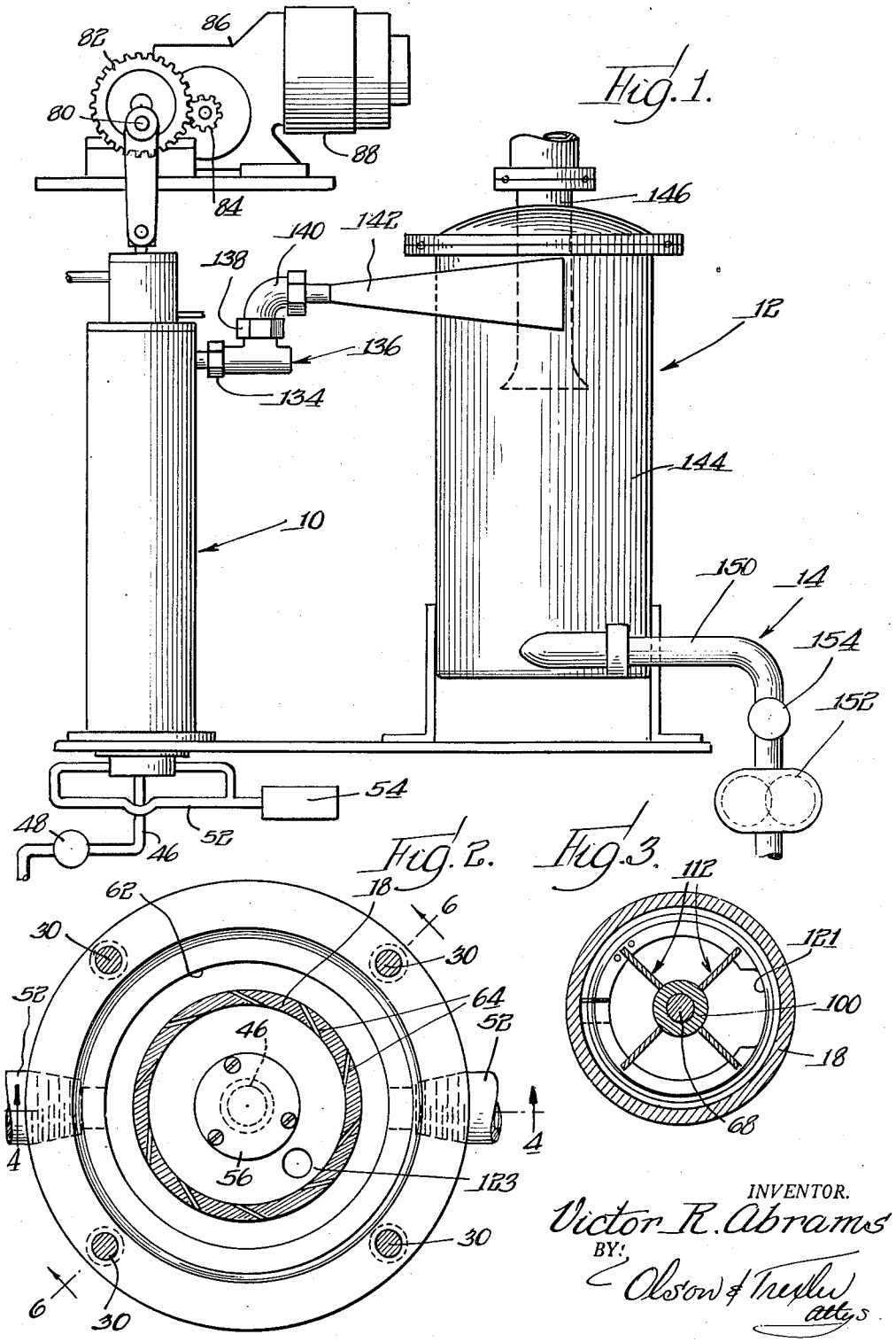
INVENTOR.
Victor R. Abrams

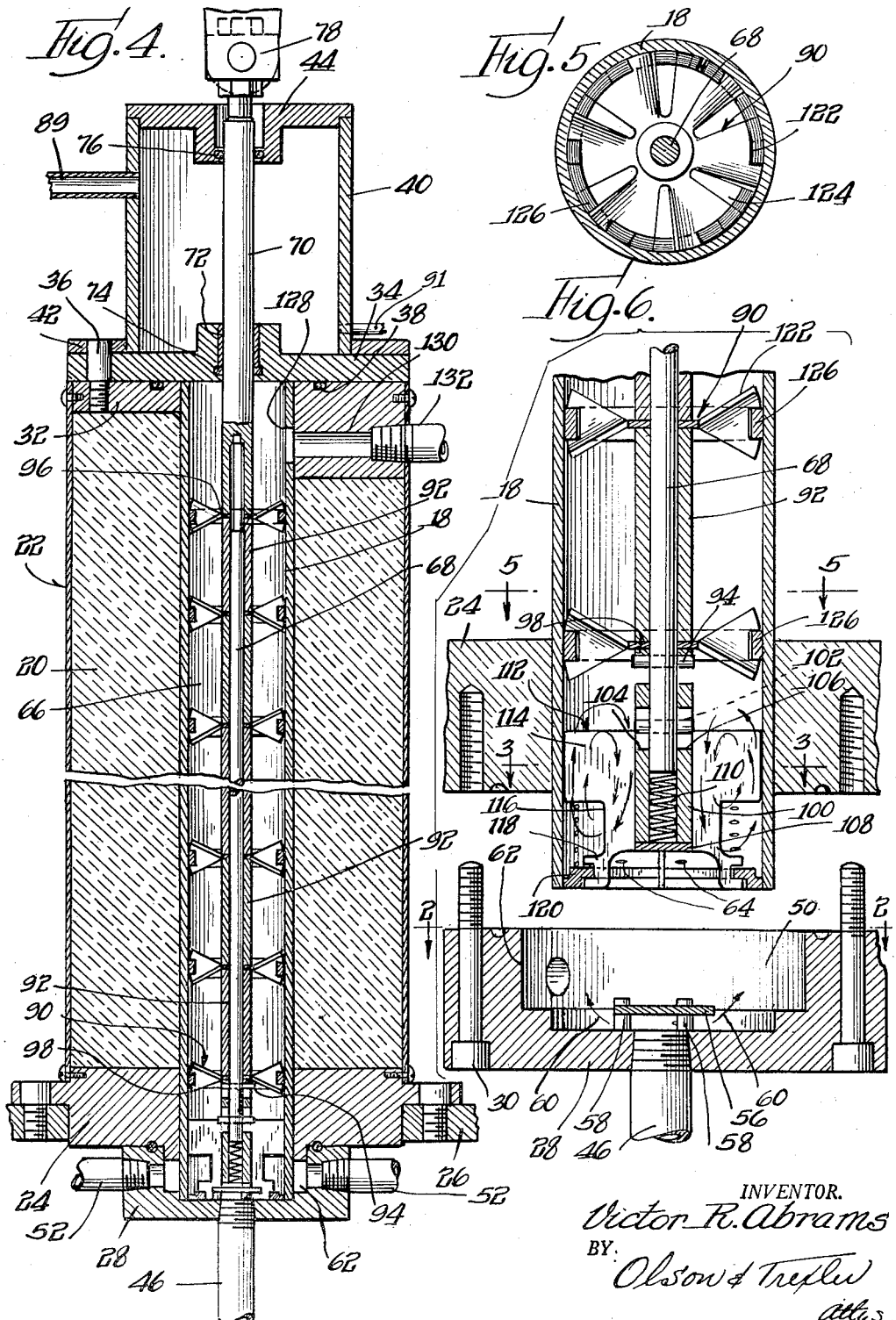

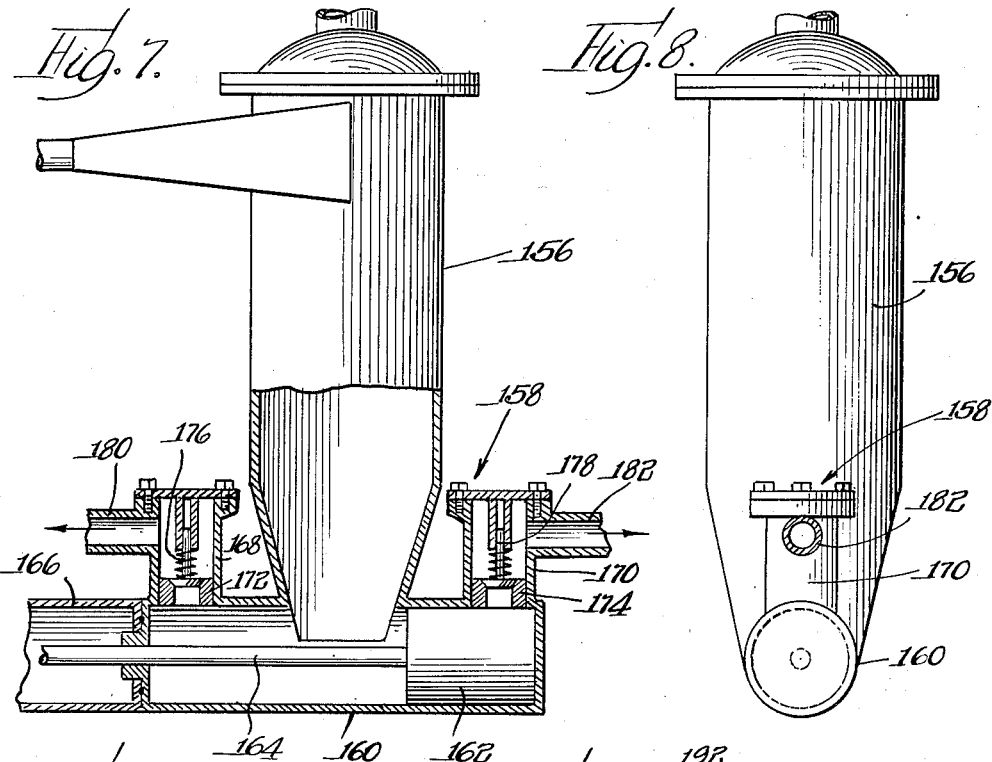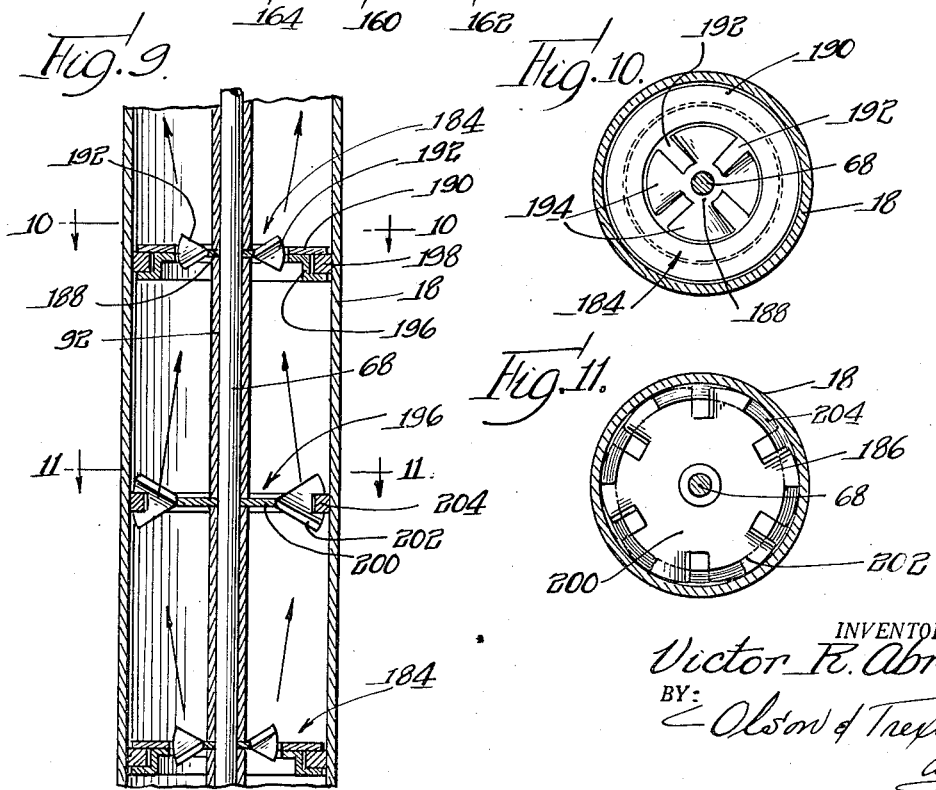

United States Patent Office 2,909,985
Patented Oct. 27, 1959

2,909,985
FOOD STERILIZER

Victor R. Abrams, Rockford, Ill., assignor to W. F. and John Barnes Company, Rockford, Ill., a corporation of Illinois Application January 7, 1955, Serial No. 480,394

10 Claims. (Cl. 99—251)

This invention relates to an apparatus for sterilizing and processing food products.

The application of heat to food stuffs as a step in commercial canning operations for the cooking and/or sterilization of food products is a delicate operation. Canning techniques are fraught with the problems of temperature and time control so as to best preserve the taste, nutrition value, texture and desired physical characteristics of the food product processed. The preservation of such qualities is required notwithstanding the subjection of the food product to temperatures that will destroy spore producing organisms so that an effective non-spoiling canned product is obtained. Canning operations consequently must fall in an "in between zone" wherein a sterile food product is obtained without impairing the desired qualities of the ultimate canned product.

The cookery and sterilization techniques are many and varied. More recent canning procedure recognizes an underlying philosophy that processing food at high temperatures for a short interval and then rapidly cooling the food generally yields a superior product over other processes employing low temperatures over longer time periods. One more recent canning technique may be described as the aseptic method wherein a food product is cooked and sterilized separately from the sterilization of the container and lid, with filling and sealing of the container occurring in a sterile atmosphere. This invention is directed to improvements in methods and apparatus well adapted for use in aseptic canning systems for effecting uniform product processing, and to sterilize the product by heat means thereby to completely destroy all forms of life in the product.

The aseptic canning method uses to advantage the principle of subjecting food substances to high temperatures while under pressure, for a short period, in equipment generally characterized as a closed heat exchanger. The resultant sterilized product is quickly cooled and sealed in a container under aseptic conditions. The process is continuous from the cooking and/or sterilization step through sterilization of the container and lid, and the filling operations.

A common problem occurring in food sterilization arises in the heat exchange equipment employed. The heat exchanger may be a simple coiled structure of conventional tubular or plate design or it may be comprised of a rotor type heat exchanger. In all of such known equipment, a thin boundary layer of the product flowing through the exchanger clings to the wall of the exchanger and the remainder of the product moves in varying degrees of laminar flow. Laminar flow may be described as that situation which develops when a center portion of material flowing through a conduit flows at a rate faster than portions of the material disposed laterally of such center portion. Consequently, the product is subjected to varied times of heat treatment, and uniform treatment of the product is thus prohibited. In addition, the product portions forming the boundary layer that engage the exchanger walls eventually "burn on."

After the initial boundary layer "burns on" successive boundary layers are formed and "burn on" with the resultant reduction of the effective diameter of the exchanger conduit, so that the usefulness and effectiveness of the exchanger is impaired until it finally becomes inoperative. Attending the burned-on or scorched product situation is the possibility for particles of the scorched product to be carried through successive stages of the canning operation with ultimate taste modification of the canned product. In addition, intermediate conditions between relative free flow at the center and immobility at the boundary product segments of the product having intermediate velocities which create longer but indeterminate process times for each of the segments. An important object of the present invention is the provision of food sterilizing apparatus that avoids problems arising from laminar flow.

Another object of the invention is the provision of a novel apparatus whereby a food substance is intimately mixed with a sterilizing medium in a rapid and effective manner, thereby to completely sterilize the food substance at a minimum processing time.

A more specific object of the present invention is to provide a novel apparatus whereby saturated steam is introduced into and rapidly blended with the food product and is substantially instantaneously condensed to impart its latent and sensible heat to the product to provide a homogeneous mixture of food product and condensate at a uniform temperature, and whenein the mixture is maintained under sufficient pressure to prevent localized superheating and resultant formation of steam bubbles in the mixture which would impair uniform treatment of the food.

Another object of the invention is the provision of inexpensive canning apparatus that encompasses the injection of steam tangentially into a cylinder containing the food product to condense the steam immediately, thereby to effectively intermix the condensed steam with a food product as a continuous canning phase; and wherein the mixture is carried by the flow of the condensed steam and the food product through the cylinder thereby to sterilize the food product.

Another object of the invention is the provision of canning mechanism, as part of a continuous canning phase, wherein the continuous passage of a food sterilizing mixture through a cylinder is periodically redirected, oriented and blended, whereby a uniformly processed product is released from the cylinder.

Another object of the invention is the provision of heating apparatus for use in a continuous canning process that avoids the problems and penalties of laminar flow and prevents "burn-on," and wherein a food product is adequately sterilized so as to insure the desired qualities of the resultant food product.

A still further object of the invention is the provision of a novel apparatus whereby a sterilized product may be delivered free of dilution by the sterilizing medium or at any desired concentration, within the limits of the operating conditions.

Other objects of the present invention will become apparent from the following description and the accompanying drawings wherein:

Fig. 1 is an elevational view of an apparatus embodying the principles of this invention;

Fig. 2 is an enlarged section of the jet mixing section taken in a plane along the line 2—2 of Fig. 6;

Fig. 3 is a sectional view of the baffle structure taken in a plane indicated by the line 3—3 in Fig. 6;

Fig. 4 is an enlarged vertical sectional view of the sterilizing tube assembly taken along the line 4—4 in Fig. 2;

Fig. 5 is a sectional view on the line 5—5 of Fig. 6 illustrating the interrupter plates housed in the sterilizing tube;

Fig. 6 is an enlarged sectional view taken along the line 6—6 in Fig. 2 showing a portion of the bottom end of the sterilizing tube, partly exploded, to best illustrate the relationship of the jet mixing section and the associated parts;

Fig. 7 is a side elevational view partially broken away of a modified form of the apparatus for cooling and separating the processed food;

Fig. 8 is an end elevational view of the structure shown in Fig. 7;

Fig. 9 is a sectional view of a slightly modified form of the apparatus;

Fig. 10 is a cross sectional view taken along line 10—10 in Fig. 9; and

Fig. 11 is a cross sectional view taken along line 11—11 in Fig. 9.

Referring now more specifically to the drawings, wherein like parts are designated by the same numerals throughout the various figures, the apparatus of the present invention includes sterilizing means 10 wherein the food stuff is mixed with a suitable heated sterilizing fluid such as steam, cooling and separator means 12 for removing all or any desired part of the sterilizing fluid from the food stuff or even condensing the food stuff in a manner to be described below, and means 14 for directing the separated food to any desired delivery point.

The sterilizing means 10 includes an elongated chamber conveniently provided by an elongated tube 18 which is preferably surrounded by a thick layer of suitable insulating material 20 and enclosed in a shell 22. The lower end of the tube 18 projects from the insulating material and extends through and is suitably secured as by welding to a base plate 24. The base plate 24 is mounted to a portion 26 of the apparatus frame by a suitable means such as screws and the like. The lower end of the tube is closed by means of an injection head 28 which will be described more fully below and which is secured in place by means of a plurality of screws 30 threaded into the base plate. A flange 32 is welded or otherwise secured to the upper end portion of the tube 18 and an end plate 34 is disposed over the upper end of the tube and is secured to the flange 32 by means of a plurality of screws 36 for closing the upper end of the tube. Preferably, suitable sealing means such as an O-ring 38 is provided between the flange of the end plate. In addition, housing means 40 is mounted on the end plate 34 for a purpose to be described below, which housing means includes a flange 42 which is also secured by means of the screws 36, and an end plate 44.

The sterilizing apparatus 10 is particularly adapted for use in sterilizing liquid food stuffs such as soups, juices or the like. The liquid food stuff is forced into the lower end of the tube 18 through an inlet conduit 46 by any suitable pressure creating means such as a pump 48. It should be noted that the inlet conduit 46 is threaded into the center of the injection head 28 so that the liquid food is initially directed centrally and axially into the lower portion of the tube, which conveniently may be designated as a mixing chamber 50. Sterilizing fluid, which is preferably saturated steam under pressure, is also injected into the mixing chamber through the injection head 28 in the manner to be described below, and the sterilizing fluid or steam is supplied to the injection head through a plurality of conduits 52 from a suitable pressure source such as a tank or boiler 54 schematically shown in Fig. 1. Wet steam is preferably used since heat is transferred therefrom as it condenses to the food much more rapidly than heat will transfer from superheated steam or gas.

In accordance with the present invention, the liquid food stuff and the sterilizing fluid or steam will rapidly and intimately mix and condense within the chamber 50 so that all particles of the food stuff will almost immediately be heated to the desired sterilizing temperature. In order to facilitate such intimate mixing, a deflector plate 56 is mounted on a plurality of pins or screws 58 above and in axial alignment with the terminal end of the inlet conduit 46 so that the liquid food entering the chamber 50 is directed radially outwardly in all directions as indicated by the arrows 60. Thus, an initial radial motion is set up in the liquid food. The sterilizing fluid or steam conduits 52 communicate with an annular chamber 62 within the injection head from which the steam passes into the mixing chamber through a plurality of apertures 64 in the tube, which apertures are spaced in rows extending axially of the tube with the rows spaced circumferentially of the tube. It is important to note that as shown best in Fig. 2, the apertures 64 are formed substantially tangentially with respect to a circle defined by the inner wall of the tube so that the sterilizing fluid or steam is directed tangentially into the mixing chamber 50. The tangentially directed steam, because of its velocity due to expansion and consequent momentum, sets up a circular motion in the body of liquid food stuff in the mixing chamber, which circular motion combines with the radial motion of the liquid to insure an intimate mixing of the sterilizing fluid or steam and particles of the liquid food stuff within the mixing chamber. It will be appreciated that since all particles of the liquid food stuff are substantially immediately brought into intimate contact with the steam as a result of the rapid radial and circular swirling motion of the liquid, the temperature of the entire body of liquid food stuff within the lower mixing chamber will be almost instantaneously raised to the desired sterilizing temperature by the rapidly condensing steam. Furthermore, as a result of the intimate blending and the fact that the mixture of condensate and food is maintained under sufficient pressure by means set forth below to prevent the formation of any superheated steam, the temperature throughout the entire liquid body within the mixing chamber will be uniform. Thus, the disadvantages of apparatus heretofore known which required the outer portions of the liquid body to be unduly heated in order to raise the inner portions of the body to the desired temperature are overcome.

As is well known, in order to obtain proper sterilization of the food stuff, the temperature thereof must not only be raised to the desired sterilizing temperature as rapidly as possible, but this temperature must also be maintained for a predetermined period of time. The exact period of time will, of course, depend, among other things, on the products to be sterilized and the temperature to be used. In the sterilizing apparatus 10, the chamber 66 provided by the tube 18 above the lower chamber 50 being well insulated against heat loss functions to permit the food stuff to be held at a substantially constant temperature while flowing therethrough. In order substantially to eliminate laminar flow of the food stuff and the problems created by such flow while the food stuff is passing through the holding chamber, the sterilizing apparatus is provided with the mechanism now to be described. This mechanism includes a rod 68 centrally disposed within said chamber 66 and extending longitudinally therethrough. The upper end of the rod 68 is suitably fixed to the lower end of a rod 70, which is slidably retained for reciprocating movement by a bearing 72 mounted in the plate 34. An O-ring 74 or other suitable sealing means is provided for preventing the escape of liquid from the holding chamber 66 past the rod 70 and through the bearing 72. The rod 70 also extends upwardly through an opening in the end 44 of the housing means 40, which opening is sealed by a suitable means such as an O-ring 76 and the upper end of the rod is connected with one end of a link 78 which has its opposite end eccentrically connected by means of a pin 80 to a gear 82. The gear 82 is driven by an output gear 84 of a speed reduction unit 86, which speed reduction unit is, in turn, driven by any suitable means such as an electrical motor 88. The housing 40 is adapted to receive and contain steam introduced therein through a conduit 89 from a suitable source of supply such as the boiler or tank 54, and this steam serves to maintain the rod 70 in a sterilized condition. A steam outlet conduit 91 also communicates with the housing.

Disposed on the rod 68 is a series of fan-like members 90 which are maintained in spaced relationship with respect to each other and against axial movement relative to the rod by means of a plurality of spacing sleeves 92 and a pin 94. Thus, the fan-like members and the spacing sleeves are trapped between the end 96 of the rod 70 and the pin 94 which is positioned immediately below the lowermost fan-like member 90. If desired, a washer 98 may be provided between the pin 94 and the lowermost fan-like member 90. The fan-like members are preferably fixed against rotation relative to the rod 68 by any suitable means. A tubular sleeve 100 is slidably disposed on the lower end of the rod 68 and is retained in assembled relationship therewith by means of a pin 102 extended transversely through the rod and projecting into elongated slots 104 and 106 on opposite sides of the sleeve. Thus, the sleeve is movable with the rod and is also free for limited axial movement relative to the rod. The lower end of the sleeve is closed by an insert 108 and a compression spring 110 is disposed within the sleeve and between the insert 108 and the lower terminal end of the rod 68 for the purpose set forth below. Fixed on and carried with the sleeve 100 is a plurality of radially extending vanes 112 which have upper portions 114 extending substantially to the wall of the tube 18 and lower cut away portions 116. In addition, finger portions 118 extend downwardly from the cut away portions 116 of the vanes, which finger portions have bifurcated ends carrying an annular member 120 for engaging and scraping the wall of the tube. It should be noted that the annular member or ring 120 has an outer peripheral portion offset downwardly so that it is substantially co-extensive with the lowermost edges of the finger portions whereby the ring may engage and scrape the extreme lowermost end of the tube wall. As shown in Fig. 3, the ring 120 is recessed at 121 to provide clearance for a thermocouple, not shown, which may be inserted through the opening 123, shown in Fig. 2. The thermocouple is a part of a control system, not shown, for regulating the temperature of the liquid material being processed.

The mechanism including the reciprocating rods and the fan-like members of the vanes carried thereby is reciprocated continuously in order to prevent laminar flow of the liquid through the tube 18 and to prevent "burn-on" or a deposit of the food stuff on the wall of the tube. More specifically, the vanes 112 at the lower end of the rod 68 serve to restrain the circular motion of the liquid to such an extent that the liquid under pressure of centrifugal force will not tend to prevent the steam from entering the chamber and to straighten out and direct the swirling liquid in the mixing chamber as the liquid leaves the mixing chamber and enters the holding chamber. Thus, the motion of the mixture in the chamber 50 is complex, it commences as a rotary motion which is in part converted to flow, by the vanes, along the walls and upward past the vanes, then because the tube is full it turns inwardly and downwardly back adjacent to center of the vanes in toroidal flow and circulation. In addition, the ring 120 serves to scrape the walls of the tube within the mixing chamber to prevent deposits of the liquid food stuff from occurring and thus forestalls building up and burning on the walls. As mentioned above, the ring 120 is formed so that it is engageable with the extreme lowermost end of the tube wall and the sliding connection of the sleeve 100 on the rod 68 and the spring 110 enables the ring 120 to be lowered to the end of the tube and against the bottom of the injection head 28 without injury to the mechanism. It will be appreciated that the spring 110 resiliently urges the sleeve 100 and the vanes carried thereby downwardly with respect to the rod 68 so that the rod may be lowered until the lower terminal edges of the vane fingers and the ring 120 positively engage the injection head whereupon further downward movement of the rod merely compresses the spring without injuring the apparatus. It should be noted that when the vanes are in their lowermost positions as shown in Fig. 4, the cut away portions 116 thereof leave an annular portion of the mixing chamber unobstructed so as to permit continuous intimate mixing of the liquid food stuff and the heated sterilizing fluid.

The mixture of the liquid food stuff and sterilizing fluid continuously flows in the manner indicated by the arrows in Fig. 6 and portions thereof are continuously forced under pressure from the mixing chamber and through the holding chamber 66. As shown best in Figs. 4, 5 and 6, each of the fan-like members 90 includes a plurality of circumferentially spaced radially extending blades 122, which blades are twisted about their radial axes or helically formed to provide helical slits 124 therebetween. It should be noted that the blades of adjacent fan-like members are twisted or helically formed in opposite directions. Thus, the liquid flowing through the holding chamber must reverse its flow direction to pass through the alternate oppositely formed helical openings or spaces in the blade-like members in a tortuous manner so that the tendency for laminar flow or a tendency for stream lines to pass rapidly and selectively through the holding tube is minimized. Furthermore, the blade-like members reciprocate longitudinally within the tube with the rod 68 and serve to continuously churn local portions of the mixture of liquid food stuff and condensate without over-all mixing whereby substantially all laminar flow is eliminated. In order to prevent deposits of the food stuff from accumulating and burning on the wall of the tube defining the holding chamber, each of the fan-like members carries a split scraper ring 126 which engages and cleans the wall of the tube. It is understood that the eccentric mechanism for reciprocating the rod 68 should be such that the stroke of the rod 68 is greater than the distance between the scraping rings 126 so that all portions of the tube wall will be clean. Furthermore, the resilient connection between the rod 68 and the sleeve 100 should be such that when the rod is in the lowermost position, the position of the lowermost scraper ring 126 is below the uppermost position of the ring 120 when the rod is raised.

From the above description, it is seen that the present invention has provided a novel method and apparatus whereby any fluid material and particularly, fluid food stuff may be rapidly and efficiently sterilized uniformly and without injury thereto. More specifically, it is seen that the liquid material or food stuff is initially intimately mixed with the heated sterilizing fluid, which is preferably wet steam under pressure so that all particles of the liquid are substantially brought to a uniform desired sterilizing temperature and thereafter the liquid is held at that temperature while localized blending continues, whereby all particles of the liquid are uniformly and effectively sterilized without injury to any portions of the liquid as a result of overheating. Furthermore, with the apparatus described thus far, it is seen that laminar flow and the resulting disadvantages have been eliminated and that high efficiency of the apparatus is insured since the problem of "burn-on" is substantially eliminated.

The homogeneous mixture of sterilized liquid and condensate is discharged from the tube 18 through an opening 128 adjacent the upper end of the tube, a passageway 130 formed in an enlargement of the flange 32 and a discharge conduit 132. The conduit or pipe section 132 communicates with an inlet 134 of a relief valve assembly 136, which relief valve assembly has an outlet 138 connected by means of a pipe section 140 with a nozzle 142 of the cooling and separating means 12. The relief valve in combination with the above described means for supplying the food and steam under pressure serves to maintain the pressure within the tube 18 sufficiently high to prevent superheated steam bubbles from forming.

The outwardly flaring discharge end of the nozzle extends into a tank 144 so that the mixture of the liquid food stuff is expanded as it passes through the nozzle and discharges into the tank. The tank 144 is hermetically sealed and is placed under vacuum or a lower pressure than the tube 18 so that as the liquid food stuff and condensed steam or sterilizing fluid mixed therewith are discharged through the nozzle and into the tank, the steam is vaporized and the liquid is flash cooled to the desired temperature. This rapid cooling is important since the food product might be injured if it were held at the sterilizing temperature too long or if it were slowly cooled. A conduit 146 projects through the top of the chamber 144. This conduit is connected with a suitable source of vacuum or reduced pressure, not shown, and serves as an outlet through which the vapor within the chamber may escape. As will be understood, the amount of liquid vaporized and removed from the mixture entering the chamber and the temperature to which the mixture is cooled may be controlled by controlling the amount of vacuum to which the tank is subjected and by controlling the input temperature of the liquid. Thus, all of the steam introduced into the liquid food stuff in the sterilizing apparatus may be removed in the cooling and separating tank 144 so that the concentration of the liquid food stuff collecting on the bottom of the chamber 144 is the same as the concentration of the food stuff entering the sterilizing apparatus. If desired, the vacuum and feed temperature may be adjusted so that only a portion of the condensed steam is removed from the liquid food stuff. On the other hand, the vacuum and feed temperature may be adjusted so that the mass of liquid removed from the mixture entering the chamber is greater than the mass of the condensed steam so that the liquid food stuff collecting at the bottom of the chamber has a higher concentration than the food stuff entering the sterilizing apparatus.

The means 14 for removing the sterilized and cooled food from the vacuum chamber includes a conduit 150 which communicates with a bottom portion of the chamber. A positive displacement pump 152 is installed in the conduit for drawing the food from the chamber, and a check valve 154 is placed in the conduit between the pump and the chamber to prevent the fluid from being drawn back into the chamber when the pump is not in operation. The conduit 150 may be extended to deliver the sterilized food to any suitable receptacle such, for example, as a supply tank for a dispensing or container filling device, not shown.

In Figs. 7 and 8 there is shown a separating and cooling vacuum tank 156 which may be substituted for the above described tank 144 and which is combined with a modified structure 158 for removing the accumulated food product from the tank. In this embodiment the bottom of the tank 156 opens into an elongated cylinder 160 in which a piston 162 is slidably disposed. The piston is secured to a rod 164 which extends through an end of the cylinder and into an elongated steam chest 166 whereby the rod is maintained in a sterile condition. The steam chest 166 may also form the cylinder for a steam engine used to reciprocate the rod 164 and thus the piston 162 or any other suitable means may be provided for reciprocating the rod. Extending upwardly from oppoite ends of the cylinder 160 are cylindrical valve chambers 168 and 170 respectively having valve seats 172 and 174 mounted therein for cooperation with spring biased check valves 176 and 178. The valve housing 168 is connected with a discharge conduit 180 and the valve housing 170 is similarly connected with a discharge conduit 182. The conduits 180 and 182 may direct the food to different receptacles such as tanks of filling devices or they may be joined with a common manifold, not shown. Furthermore, the piston pump may be used as a booster for another pump or pressure device, not shown, which then directs the liquid to a filling device.

With the piston 162 in the position shown in Fig. 7 it is seen that the food product will fill the left end of the cylinder 160 so that as the piston is moved toward the left, the food will be forced through the check valve 176 and out through the conduit 180. As the piston moves to the left end of the cylinder, the right end of the cylinder will be filled with the food product, whereby upon reverse movement of the piston the food product will be forced out through the check valve 178 and the conduit 182.

Figs. 9, 10 and 11 show a modification of the above described apparatus wherein all of the elements are the same except that the fan-like baffle members 90, described above, are replaced by baffle members 184 and 186. Each of the baffle or impeller members 184 includes a narrow inner annular portion 188 and a relatively wide outer annular portion 190 joined by a plurality of spokes or arms 192. Between the inner and outer annular portions the disc is formed with a plurality of helically formed blades 194. A retaining ring 196 is welded or otherwise secured to the outer annular portion 190 for providing a peripheral channel adapted to receive a split plastic scraper ring 198. The baffle or impeller member 186 is similar to the above described baffle members 90 except that it is provided with a relatively wide inner annular body portion 200 and relatively short peripherally spaced blades 202. The outer ends of the blades 202 are notched to receive a split plastic scraper ring 204. As shown in Fig. 9, the baffle members 184 and 186 are alternately positioned within the tube 18 and their blade portions are twisted in opposite directions. Thus the baffle members 184 and 186 function in the same manner as the corresponding baffle members described above. In addition it should be noted that the fluid flowing through the baffle members 184 and 186 is first directed toward the center of the tube by the baffle member 184 and then toward the wall of the tube by the baffle member 186, whereby further to increase localized blending of the food product and condensed steam mixture and to restrain the formation of any set flow patterns.

From the above description, it is seen that the present invention has provided a novel apparatus wherein liquid foods such as milk, puddings, custards, soft vegetables, fruit, juices, soups and purees may be continuously and effectively sterilized without injury thereto, then flash-cooled to the desired temperature and separated from the streilizing medium while being maintained in a sterile atmosphere, and finally discharged into suitable sterile receptacles and filling mechanism to be loaded into cans or the like. More specifically, it is seen that the present invention has provided a novel apparatus whereby the liquid food stuff is initially intimately mixed with a heated sterilizing fluid such as steam so that substantially all particles of the liquid are rapidly brought into a uniform sterilizing temperature, and then the food stuff is held at the sterilizing temperature for a predetermined period of time. Furthermore, it is seen that the present invention has provided a novel sterilizing apparatus which includes means for preventing deposits of the liquid food stuff from forming or accumulating or scorching on the walls thereof so that the efficiency of the apparatus is maintained at a maximum and so that the finally processed food stuff is free from burned or scorched particles. It is also seen that the present invention has provided simple and compact means for separating and cooling the liquid food stuff from the sterilizing medium and for filling the food stuff into suitable containers.

While the preferred embodiment of the present invention has been shown and described herein, it is obvious that many structural details may be changed without departing from the spirit and scope of the appended claims.

The invention is claimed as follows:

1. An apparatus for sterilizing food products comprising chamber means, means for directing a food product and a sterilizing fluid continuously and under pressure into said chamber means and for rapidly intimately mixing said food product and said sterilizing fluid, said directing means including a plurality of axially spaced fluid inlet aperture means through a side wall of said chamber means, axially reciprocable annular means disposed for scraping said side wall, means for reciprocating said scraping means past said aperture means, which scraping means has an axial extent for preventing simultaneous blocking of all of the aperture means, outlet means for said chamber means, and means for mixing the food product and said sterilizing fluid during movement thereof through said chamber means toward said outlet means.

2. An apparatus for sterilizing liquid material comprising elongated pressure chamber means, means for continuously forcing liquid material under pressure into one end portion of said chamber means, means for continuously directing sterilizing fluid under pressure into said chamber means end portion for intimately mixing said liquid material and said sterilizing fluid under pressure in said chamber portion, said directing means including a plurality of circumferentially spaced and axially extending rows of fluid inlet aperture means to a side wall of said one end portion, axially reciprocable annular means disposed for scraping said end portion side wall, means for reciprocating said scraping means past said aperture means, which scraping means has an axial extent substantially less than the axial extent of said rows of aperture means for preventing simultaneous blocking of all of the aperture means, outlet means for said chamber means spaced from said chamber means portion, and means for continuously mixing the liquid material and said sterilizing fluid during movement thereof from said chamber means end portion toward said outlet means.

3. An apparatus for sterilizing liquid material comprising elongated chamber means, means for directing liquid material under pressure generally axially through an end wall of and into one end portion of said chamber means, means for spreading said liquid material radially along said end wall and means for directing sterilizing fluid under pressure generally tangentially into said one chamber means end portion through an axially extending side wall of said end portion and axially offset from said end wall for intimately mixing said liquid material and said sterilizing fluid in said one chamber means end portion.

4. An apparatus for sterilizing food products comprising elongated chamber means, means for continuously forcing a food product under pressure and a sterilizing fluid under pressure into one end portion of said chamber, and means for rapidly intimately mixing said food product and said sterilizing fluid in said chamber means end portion, said last named means including a plurality of axially spaced fluid inlet aperture means through a side wall of said chamber means end portion, outlet means adjacent an opposite end portion of the chamber means, reciprocable means within said chamber means for mixing the food product and said sterilizing fluid as the mixture moves through said chamber means toward said outlet means, a plurality of means spaced apart a predetermined distance axially of said chamber means for scraping interior surfaces of said chamber means for preventing accumulation of the food product on said surfaces, one of said scraping means being disposed in said chamber end portion and having an axial extent for preventing simultaneous blocking of all of said aperture means, and means for reciprocating said scraping means a distance greater than said predetermined distance for obtaining overlapping scraping action of at least a portion of said scraping means.

5. An apparatus for sterilizing food products comprising elongated chamber means, means for directing a food product under pressure into one end portion of said chamber means and for spreading said food product radially throughout said one end portion, means for directing sterilizing material generally tangentially into said chamber means end portion for rapidly intimately mixing said food product and said sterilizing fluid in said one end portion, outlet means adjacent an opposite end of said chamber means, reciprocable means within said chamber means between said outlet means and said one end portion for mixing the food product and sterilizing fluid flowing toward said outlet means, a plurality of means spaced apart a predetermined distance axially of said chamber means for scraping interior surfaces of said chamber means for preventing any of the food product from accumulating thereon, one of said scraping means being located adjacent an end wall of said one end portion, and means for reciprocating said scraping means a distance greater than said predetermined distance for obtaining overlapping scraping action of said scraping means and for yieldably reciprocating said one scraping means for preventing injury thereto upon engagement thereof with said end wall.

6. An apparatus for sterilizing food products comprising elongated chamber means, means for directing a fluid food product under pressure into one end portion of said chamber means, a plurality of means spaced circumferentially of said one end portion for directing a plurality of jets of sterilizing material under pressure generally tangentially into said one end portion for causing a rapid intimate intermixing of said food product and said sterilizing fluid, outlet means including means for controlling back pressure adjacent an opposite end portion of said chamber means, reciprocable baffle means each having a plurality of spaced openings therethrough within said chamber means between said end portions for directing the mixture of food product and sterilizing material along tortuous paths toward said outlet means whereby to blend locally the food product and sterilizing material, a plurality of axially spaced substantially annular scraping means within said chamber means for scraping side walls of the chamber means, and means for reciprocating said scraping means for obtaining overlapping scraping action of the scraping means.

7. An apparatus for sterilizing food products comprising elongated chamber means, means for continuously directing a food product and a sterilizing fluid under pressure into one end portion of said chamber means for intimately mixing the food product and said sterilizing fluid in said one end portion, outlet means including back pressure controlling means adjacent an opposite end portion of said chamber means, a plurality of reciprocable spaced baffle units disposed between said end portions for directing the mixture of food products and sterilizing fluid along tortuous paths for localized blending as the mixture moves toward said outlet means, each of said units including a plurality of radially extending blades twisted about their radial axes, and means for reciprocating said baffle units for effecting further localized blending of said food product and said sterilizing fluid.

8. An apparatus for sterilizing food products comprising elongated chamber means, means for continuously directing a food product and a sterilizing material into one end portion of said chamber means, outlet means including back pressure controlling means disposed adjacent an opposite end portion of said chamber means, a plurality of spaced reciprocable baffle units disposed between said end portions for effecting mixing of the food product and said sterilizing fluid during movement thereof toward said outlet means, means for reciprocating said baffle units longitudinally within said chamber means a distance greater than the spacing of said units, and substantially annular scraper means carried by each of said baffle means for scraping interior surfaces of said chamber means to restrain the accumulation of substantially any of said food product on said interior surfaces.

9. An apparatus for sterilizing food products comprising elongated chamber means, means for continuously directing a food product into one end portion of said chamber means and for spreading said food product throughout said end portion, means for continuously directing a plurality of jets of sterilizing fluid generally tangentially into said one end portion for causing turbulent intimate mixing of said food product and said sterilizing fluid in said one end portion, outlet means adjacent an opposite end of said chamber means, substantially axially extending vane means adjacent said one end portion for straightening out the flow of the mixture of food product and sterilizing material moving from said one end portion toward said outlet means, and reciprocable baffle means disposed between said outlet means and said vane means for directing said mixture along tortuous paths for effecting localized blending of the mixture.

10. An apparatus for processing liquid material comprising elongated chamber means, means for continuously directing liquid material under presure and a sterilizing fluid under pressure into one end portion of said chamber means and for intimately mixing said liquid material and said sterilizing fluid in said one end portion, outlet means including back pressure controlling means adjacent an opposite end portion of said chamber means, a plurality of axially spaced reciprocable baffle units including radially extending twisted blades disposed between said end portions for effecting localized blending of the liquid material and sterilizing fluid mixture flowing toward said outlet means, substantially annular scraper member carried by each of said baffle units for scraping internal surfaces of said chamber means, means for reciprocating said units for obtaining overlapping scraping action by said scraper members, a tank, a conduit extending into said tank and terminating above a bottom thereof and connectable with a source of reduced pressure, means for directing the mixture of liquid material and sterilizing liquid from said outlet means into said tank wherein the liquid material falls to the bottom of the tank and sterilizing fluid is separated therefrom, a discharge conduit having an opening communicating with a lower portion of said tank so that liquid material accumulated in said tank may flow into said discharge conduit, valve means normally closing an outlet end portion of said discharge conduit, and pump means for moving the liquid material past said valve means and out of said discharge conduit.

References Cited in the file of this patent

UNITED STATES PATENTS

| | | |
|---|---|---|
| 202,979 | Bates | Apr. 30, 1878 |
| 229,784 | White | July 6, 1880 |
| 393,023 | Nagel et al. | Nov. 20, 1888 |
| 813,497 | Hitchcock | Feb. 27, 1906 |
| 1,954,143 | Morrison | Apr. 10, 1934 |
| 2,020,309 | Grindrod | Nov. 12, 1935 |
| 2,054,500 | Grapengeter | Sept. 15, 1936 |
| 2,122,954 | Rogers | July 5, 1938 |
| 2,401,077 | Johnson | May 28, 1946 |
| 2,452,260 | Peebles | Oct. 26, 1948 |
| 2,636,430 | Brown et al. | Apr. 28, 1953 |
| 2,682,827 | Gressey | July 6, 1954 |
| 2,730,338 | Gregorius | Jan. 10, 1956 |
| 2,801,087 | Hawk | July 30, 1957 |